(12) United States Patent
Whited et al.

(10) Patent No.: US 6,244,170 B1
(45) Date of Patent: Jun. 12, 2001

(54) FOOD PRODUCT BREADING DEVICE

(75) Inventors: Jeffrey A. Whited, Amherst; Lane Bettcher, Huron; Scott M. Muniga, Oberlin, all of OH (US)

(73) Assignee: Bettcher Industries, Inc., Birmingham, OH (US)

( * ) Notice: Subject to any disclaimer, the term of this patent is extended or adjusted under 35 U.S.C. 154(b) by 0 days.

(21) Appl. No.: 09/692,404

(22) Filed: Oct. 19, 2000

(51) Int. Cl.[7] .............................. A23L 1/00; A23L 1/22; A23G 3/00; A47J 44/00; B05C 19/00
(52) U.S. Cl. .............................. 99/494; 99/516; 99/352; 99/407; 118/13; 118/16
(58) Field of Search .............................. 99/485, 494, 516, 99/352–355, 403, 407, 450.1, 450.2; 118/13, 16–18, 19, 20, 22, 24, 239, 257, 261, 423, 429, 308, 312, 621, 626; 198/715, 384, 659, 613, 580; 426/289, 292, 293, 295, 296, 94, 96, 99, 305, 519, 560, 443, 446

(56) References Cited

U.S. PATENT DOCUMENTS

| | | |
|---|---|---|
| 895,856 | 8/1908 | Harton . |
| 910,812 | 1/1909 | Harton . |
| 2,509,533 | 5/1950 | Schoen, Jr. . |
| 2,855,893 | 7/1955 | Greer et al. . |
| 2,865,766 | 12/1958 | Christiansen et al. . |
| 3,404,659 | 10/1968 | Croston . |
| 3,547,075 | 12/1970 | Johnson . |
| 3,589,274 | 6/1971 | Murray . |
| 3,735,726 * | 5/1973 | Butler ...................................... 118/24 |
| 3,739,743 * | 6/1973 | McKee, Jr. ......................... 99/494 X |
| 3,885,519 | 5/1975 | Orlowski . |
| 3,967,583 | 7/1976 | Booth . |
| 4,497,244 * | 2/1985 | Koppens .......................... 99/450.1 X |
| 4,808,424 | 2/1989 | Wadell . |
| 5,020,427 * | 6/1991 | Kennefick et al. ................. 99/516 X |
| 5,052,330 * | 10/1991 | Stacy ................................. 118/312 X |
| 5,160,377 | 11/1992 | Montemayor et al. . |
| 5,226,354 * | 7/1993 | Stewart ................................... 99/494 |
| 5,236,502 * | 8/1993 | Wadell ................................ 118/13 X |
| 5,238,493 * | 8/1993 | Miller .................................. 99/494 X |
| 5,284,514 * | 2/1994 | Griffiths .............................. 99/494 X |
| 5,318,629 | 6/1994 | Raque et al. . |
| 5,463,938 | 11/1995 | Sarukawa et al. . |
| 5,514,399 * | 5/1996 | Cordera et al. ........................ 426/295 |
| 5,643,361 * | 7/1997 | Wadell ................................ 494/18 X |
| 5,664,489 * | 9/1997 | Herrick, IV ............................ 99/494 |
| 5,707,448 * | 1/1998 | Cordera et al. ..................... 99/494 X |
| 5,924,356 | 7/1999 | Harper et al. . |

OTHER PUBLICATIONS

"SBB Batter–Breader," Bettcher Industries, Inc., 2/97, 1 Sheet.

"The No Paper Continuous Hot Oil Filter," Sam Stein Assocites Inc., 1 sheet, no date.

* cited by examiner

*Primary Examiner*—Timothy F. Simone
(74) *Attorney, Agent, or Firm*—Watts Hoffman Fisher & Heinke

(57) ABSTRACT

A food product breading machine having a battering unit supported by a breading unit. A battering unit conveyor system delivers food products to the breading unit. The breading unit has a breading reservoir, a breading station and a breading unit conveyor system. The battering unit conveyor system propels the food products in a generally horizontal direction to the breading unit. The breading unit conveyor system propels food products toward the breading station in a generally opposite direction. The breading unit conveyor system has first and second sections, one adjacent and below the battering unit conveyor end that conveys food products downwardly and horizontally toward the breading station, the other delivering food products from the first section through the breading station and discharging the breaded products. The second section has two tiers with breaded products from the first tier falling onto the second tier before being discharged from the machine. The second section recycles unused breading through the reservoir.

18 Claims, 6 Drawing Sheets

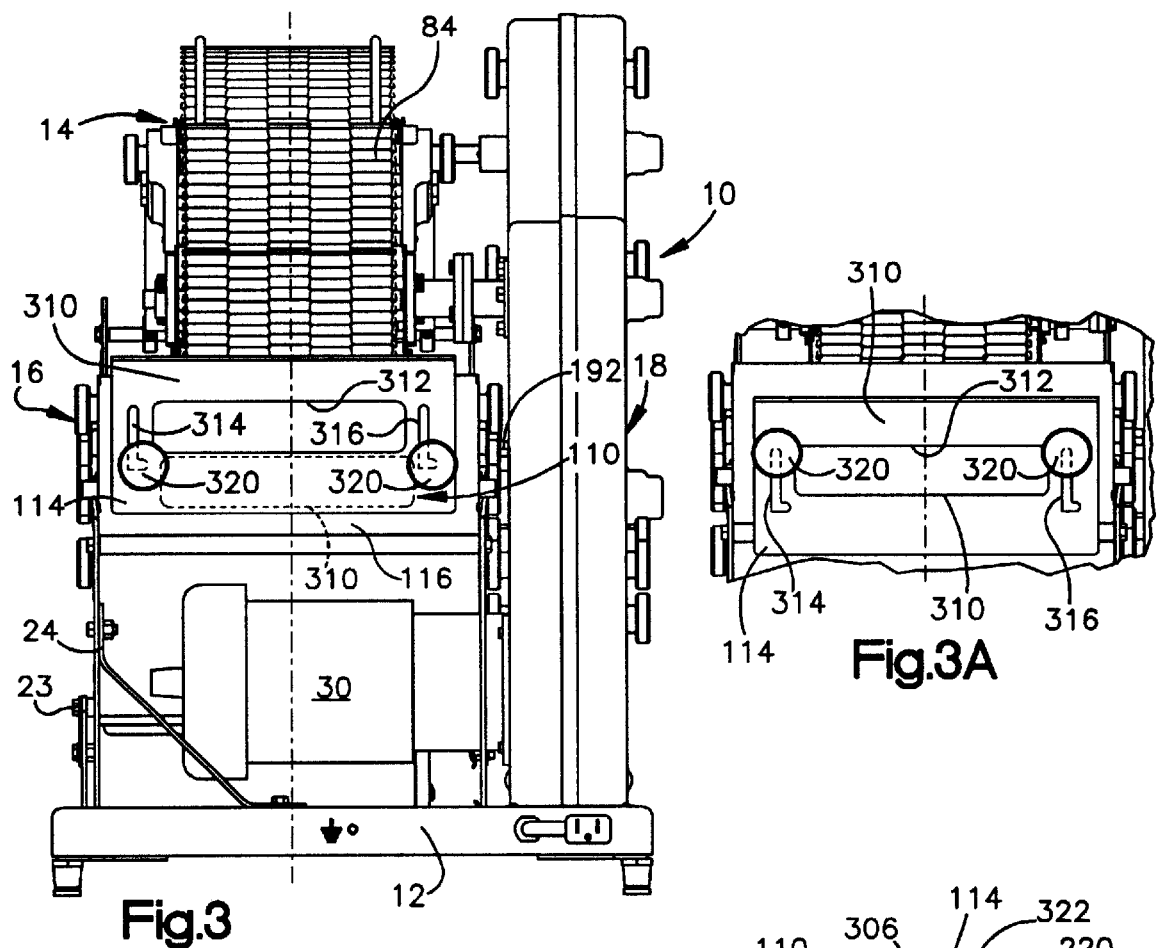
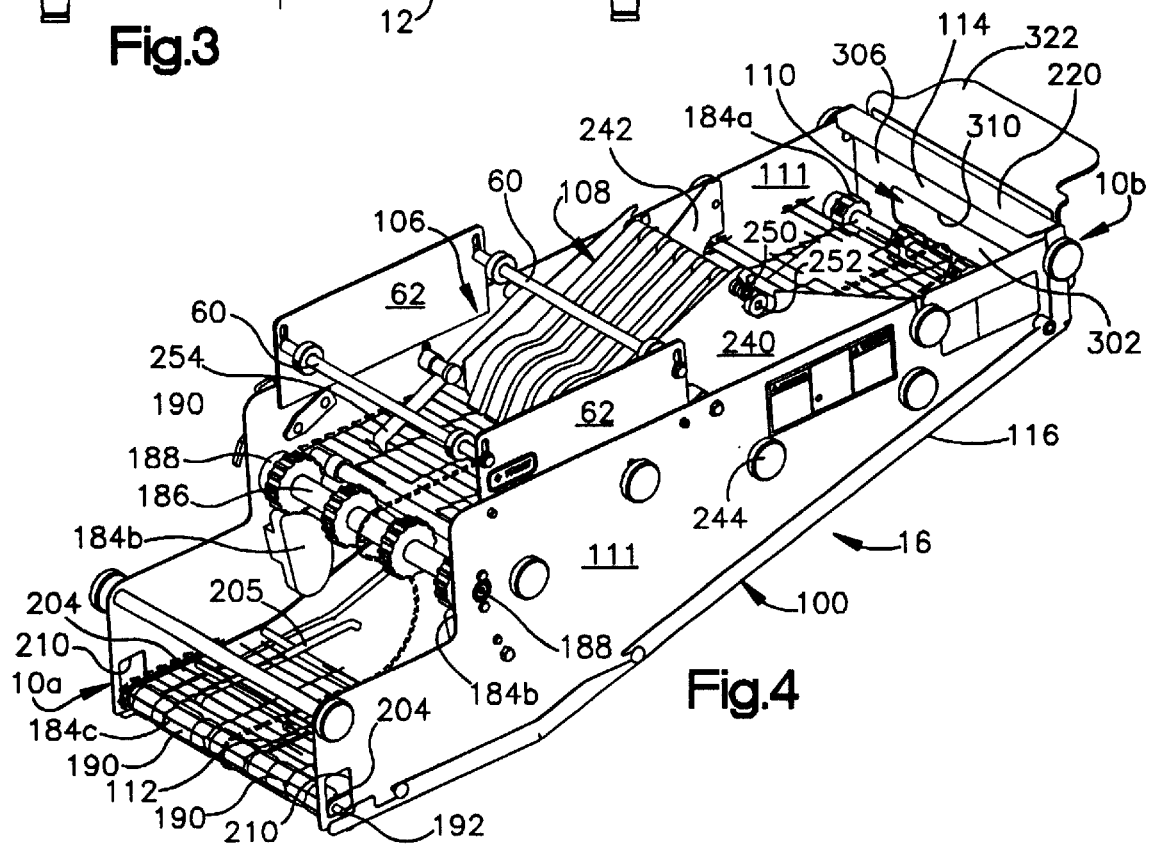

FOOD PRODUCT BREADING DEVICE

FIELD OF THE INVENTION

The present invention relates to food product breading machines and more particularly to food product breading machines that are used to coat flaccid products with particulate breading materials.

BACKGROUND OF THE INVENTION

Flaccid food products, such as fish filets and chicken tenders, and delicate, frangible products, like croquettes, are typically breaded and fried for consumption by restaurant customers. These products, together with other foods that are fried, are frequently produced and consumed in volumes sufficient to justify in-restaurant use of machinery that batters and then coats the products with particulate breading material.

The prior art machinery used for breading food products functioned for both relatively rigid products, like bone-in chicken parts, onion rings, etc., and the noted flaccid products. The machines in question utilized open mesh wire conveyor belts that carried the products through the machinery. The machines often comprised a battering unit, where the products were coated with a fluent batter, and a breading unit where breading was applied to the product and adhered to the batter coating. The battering units had a conveyor belt that delivered battered products to a breading unit conveyor belt before the breading was applied.

Machines have been constructed with the battering unit supported vertically above the breading unit. The battering and breading units were oriented so that a single attendant, at one end of the machine, could load items into the battering unit and receive the items, breaded, from the breading unit. This was a particularly effective way to bread food products to order, as the attendant could load the number of items constituting an order into the machine, receive the breaded items and fry them at once. The superposed battering and breading units also provided a small "footprint" that minimized the space occupied by the machine.

These machines were not without drawbacks. The unit conveyors were spaced vertically apart and configured so that battered items dropped from one conveyor to the other. Flaccid and frangible products, like fish filets, chicken tenders, and croquettes, presented problems. Flaccid products were often folded or heaped on the breading unit conveyor when breading was applied. Consequently, some flaccid products were only partially breaded while others were unevenly coated. Frangible products were sometimes broken up when dropped from one conveyor to the other. Relatively rigid products were more effectively handled although they sometimes landed roughly on the breading unit conveyor material and the impacts sometimes created clouds of breading and spillage.

The battering and breading machine that is disclosed in U.S. Pat. No. 5,924,356 overcame the handling problems associated with flaccid and frangible food items, as well as rough handling of dimensionally stable items, by locating the battering unit laterally spaced from and in-line with the breading unit. The battering unit conveyor was positionable adjacent the breading unit conveyor so that flaccid and frangible items were handed-off to the breading conveyor without folding, heaping, or breaking up. The machine had a relatively large foot print and required the attendant to load items into the end of the machine that was opposite from the discharge end. This required sufficient floor space for the attendant to move around the machine from one end to the other.

Another problem with the prior art breading units was that after breading material was applied, the food products often carried breading material that was either loose, or only weakly adhered to the product. Food products carrying such breading were delivered from the breading units ans placed in fryers where the breading was dislodged. This material was sometimes later be adhered to food products during frying, creating unappealing appearance and flavor.

Unloading breading material from prior art breading machines has sometimes been difficult. Some prior art machines were constructed in such a way that the entire breading reservoir had to be physically removed from the machine in order to dump the breading material. Some reservoirs were equipped with trap doors that allowed breading material to fall from the reservoir while others utilized panels that were moved into position under conveyors so that the breading could be conveyed along and discharged from the machines at a discharge location. The prior art machines were constructed for discharging breading material from machines that had particular architectures. For example, where the machines had a distinct reservoir that was located at an elevated location trap doors enabled dumped breading to be collected under the reservoir. Where the under-conveyor panels were used, the machines had a discharge location for food products that also served as the discharge location for the breading material.

The present invention provides a new and improved food product breading machine that reliably conveys flaccid and frangible food products to a breading station without folding, heaping or breakage, handles breaded food products in such a way that loose or weakly adhered breading is removed before the products are delivered from the machine, and also unloads breading material from the machine breading reservoir at a location spaced from the bottom of the reservoir and remote from the food product discharge location.

SUMMARY OF THE INVENTION

According to a disclosed embodiment of the invention a food product breading machine is provided wherein a breading unit for applying particulate breading to the food product has a breading reservoir having a base section containing unused breading, a food product breading station located above the level of the reservoir base, and a conveyor system for conveying food products and breading to the breading station and discharging breaded food products from the unit. The conveyor system comprises an upper conveyor run for conveying food products and breading through the breading station, a lower conveyor run for discharging breaded food products from the unit, and a recycling run for conveying unused breading from the reservoir base section to the upper run. The lower run is located below the level of the upper run and above the level of the reservoir base section so that breaded food products from the upper run drop onto the lower run and are discharged from the unit by the lower run.

The illustrated embodiment also features a battering unit, for applying a fluent batter to the food product that comprises a batter reservoir and a battering unit conveyor system for delivering food products from the batter reservoir. The battering unit is supported above the breading unit with the battering unit conveyor system having a discharge section that propels the food products in a first generally horizontal direction from the battering unit reservoir. Food products are delivered from the discharge section to the breading unit conveyor system. The breading unit conveyor system propels food products toward the breading station in a second direction that is generally opposite to the first direction. The breading unit conveyor system has a product receiving conveyor section that is located adjacent and below the distal end of the battering unit conveyor, vertically above the level of the breading station, and horizontally spaced from the breading station so that food products received by the breading unit conveyor system are conveyed downwardly and horizontally to the breading station.

In the disclosed embodiment of the invention the breading unit conveyor system comprises first and second food product conveyors sections, the first conveyor section located adjacent and below the distal end, and the second food product conveyor section located below the first conveyor section for delivering food products from the first conveyor to the breading station. The projecting battering conveyor system end is closely adjacent the first conveyor section so that food products transferring from the battering unit conveyor system to the breading unit conveyor section are supported by both conveyor systems during the transfer.

The breading reservoir of the disclosed embodiment is emptied of breading material quickly with little effort. The breading reservoir comprises a sloping lower wall, an end wall adjacent the upper end of the sloping wall and an open upper side, the breading conveyor system comprises a perforate conveyor belt disposed in the reservoir with a first reach extending generally horizontally along the upper reservoir side, a second reach extending along the sloping lower wall, and a transmission for driving the conveyor. The transmission drives the conveyor so that breading in the reservoir is propelled along the sloping lower wall toward the end wall. A breading discharge mechanism operates to discharge breading material from the breading unit at a location above the lower end of the sloping wall. The discharge mechanism comprises a member that is movable to create a breading discharge opening in the reservoir that is spaced above the lower end of the sloping wall so the conveyor system can deliver breading material from the unit through the discharge opening.

Other features and advantages of the invention will become apparent from the following description and from the accompanying drawings, which form part of the specification, and wherein:

BRIEF DESCRIPTION OF THE DRAWINGS

FIG. 3 is a view seen approximately from the plane indicated by the line 3—3 of FIG. 1;

FIG. 3a is a fragmentary view of part of the machine of FIG. 3 with parts illustrated in alternate positions;

FIG. 4 is a perspective view of part of the machine of FIG. 1 with parts removed;

DESCRIPTION OF THE BEST MODES CONTEMPLATED OF CARRYING OUT THE INVENTION

Figure 1:
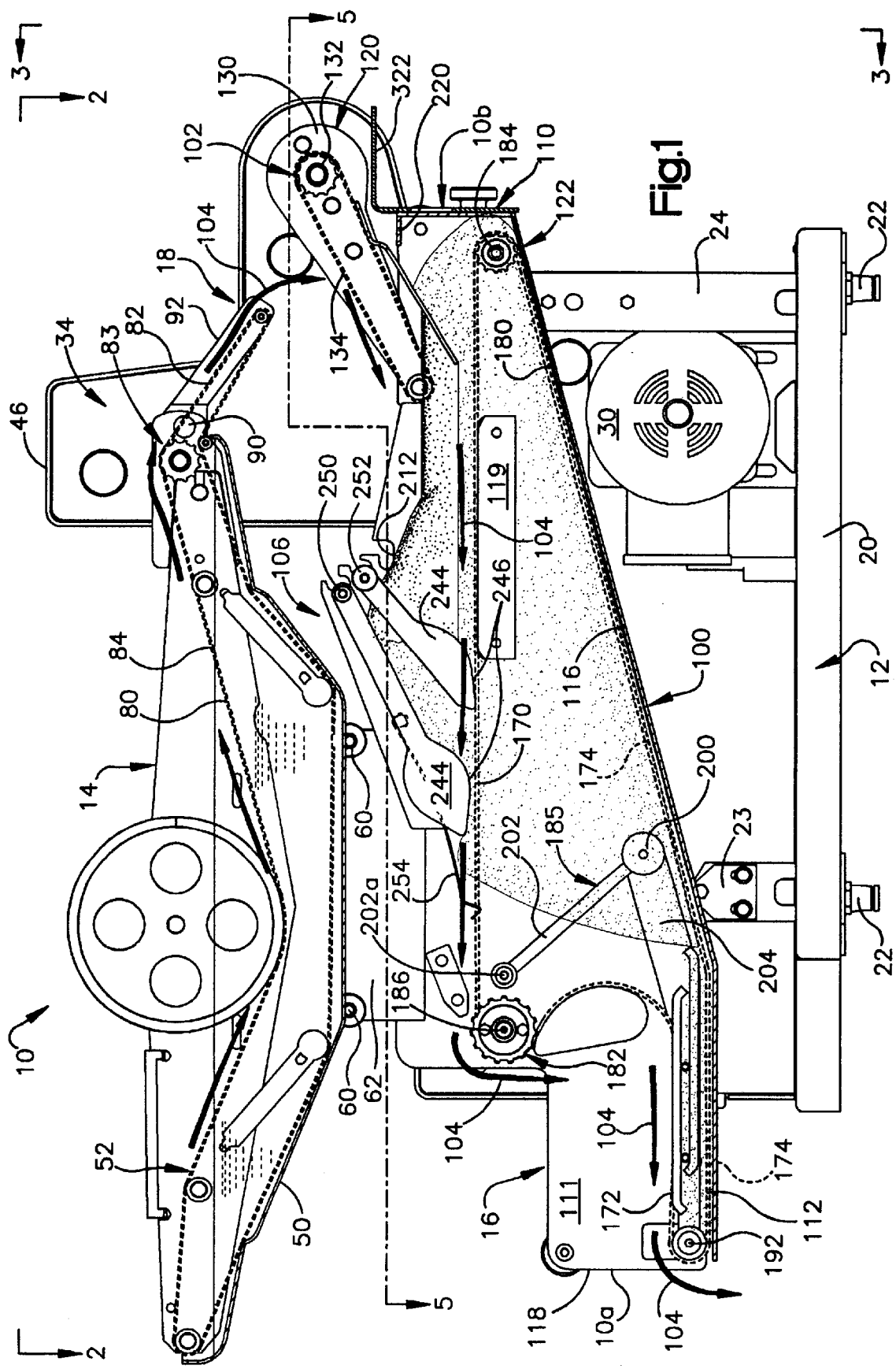
FIG. 1 is an front elevational view of a food product breading machine constructed according to the invention with parts removed.
Figure 2:
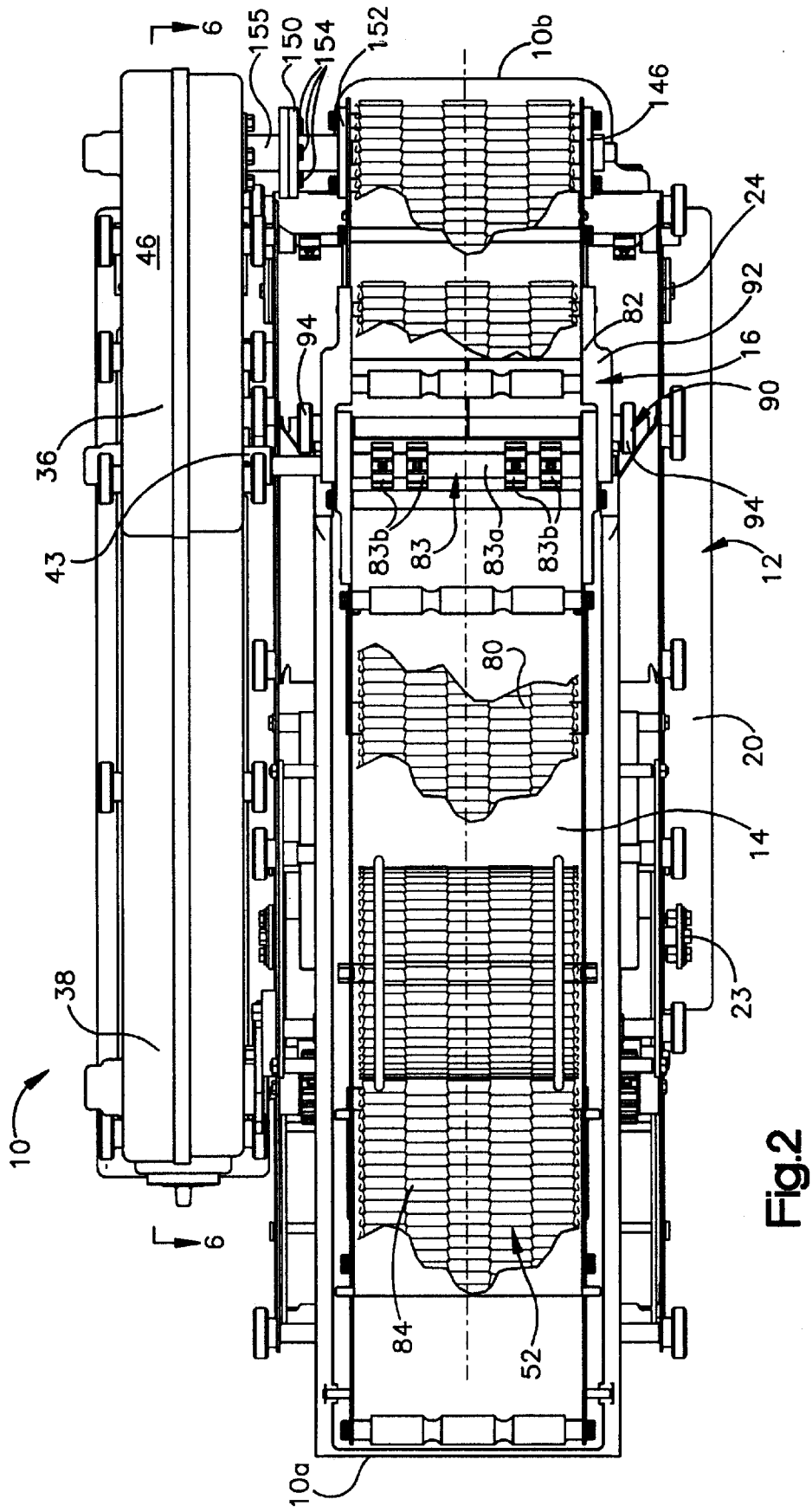
FIG. 2 is a view seen approximately from the plane indicated by the line 2—2 of FIG. 1.
Figure 5:
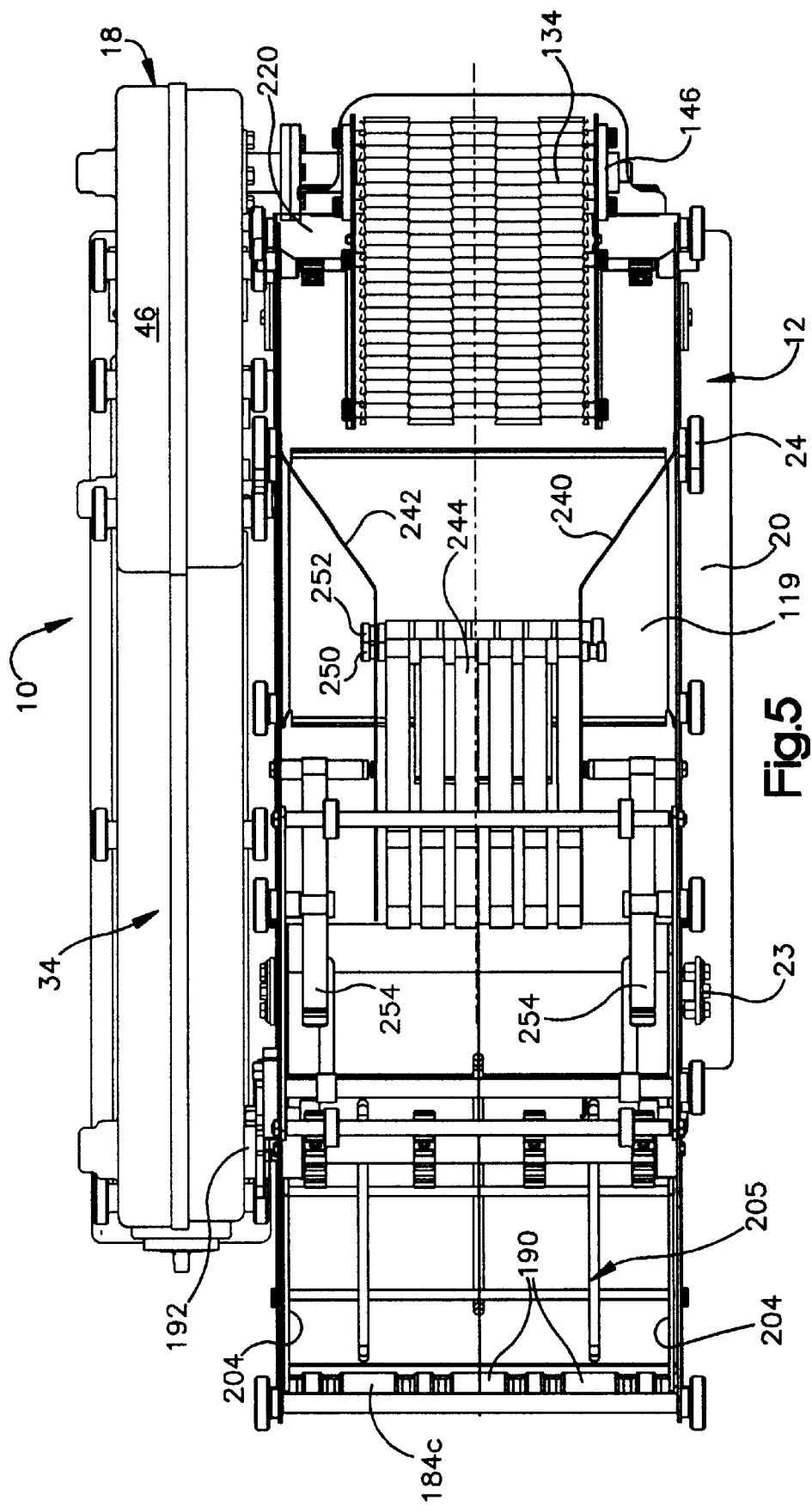
FIG. 5 is a view seen approximately from the planes indicated by the line 5—5 of FIG. 1.

A food product breading machine 10 constructed according to the invention is illustrated in the drawings. The machine 10 is especially useful in restaurants where individual food products that are flaccid, such as chicken tenders, fish filets, etc., or frangible, such as croquettes, are fried to order. The machine 10 coats individual food items with a fluent batter and then overcoats them with a particulate breading material that clings to the batter. The breaded items are discharged from the machine in condition for frying. Referring in particular to FIGS. 1–3, the machine 10 comprises a supporting base frame 12, a battering unit 14, a breading unit 16, and a drive system 18.

The machine 10 is configured with the battering unit 14 stacked on top of the breading unit 16. Food items are placed in the battering unit at one end 10a of the machine 10, conveyed in a generally horizontal direction through the battering unit, and delivered to the breading unit at the machine end 10b. The food items from the battering unit are conveyed through the breading unit in the opposite direction and discharged from the machine at the end 10a where they are collected for frying. The machine attendant can thus feed food products constituting an order into the machine and receive the breaded products from the machine without having to change position. The breaded items can be accumulated in a frying basket and immediately placed in a flyer. The relatively small area occupied by the machine 10 enables it to be positioned on a table top or counter adjacent a fryer if desired.

The illustrated base frame 12 is constructed and arranged so that the battering and breading units are detachably supported and easily removable for cleaning without requiring the use of hand tools. In the illustrated embodiment, the base frame 12 comprises a base plate 20, support legs 22, and support structures 23, 24 that extend upwardly from the base plate and bear the weight of both the breading and battering units. The illustrated support structures 23, 24 are formed by respective pairs of sheet metal stanchions that have supporting cross bars extending between their respective upper ends and on which the unit 16 rests. The stanchions pairs frictionally grip the unit 16. The unit 16 is removable for cleaning, etc. by lifting it from the cross bars. The legs 22 are sized so that the machine 10 may be placed on a table top or counter during use.

Figure 6:
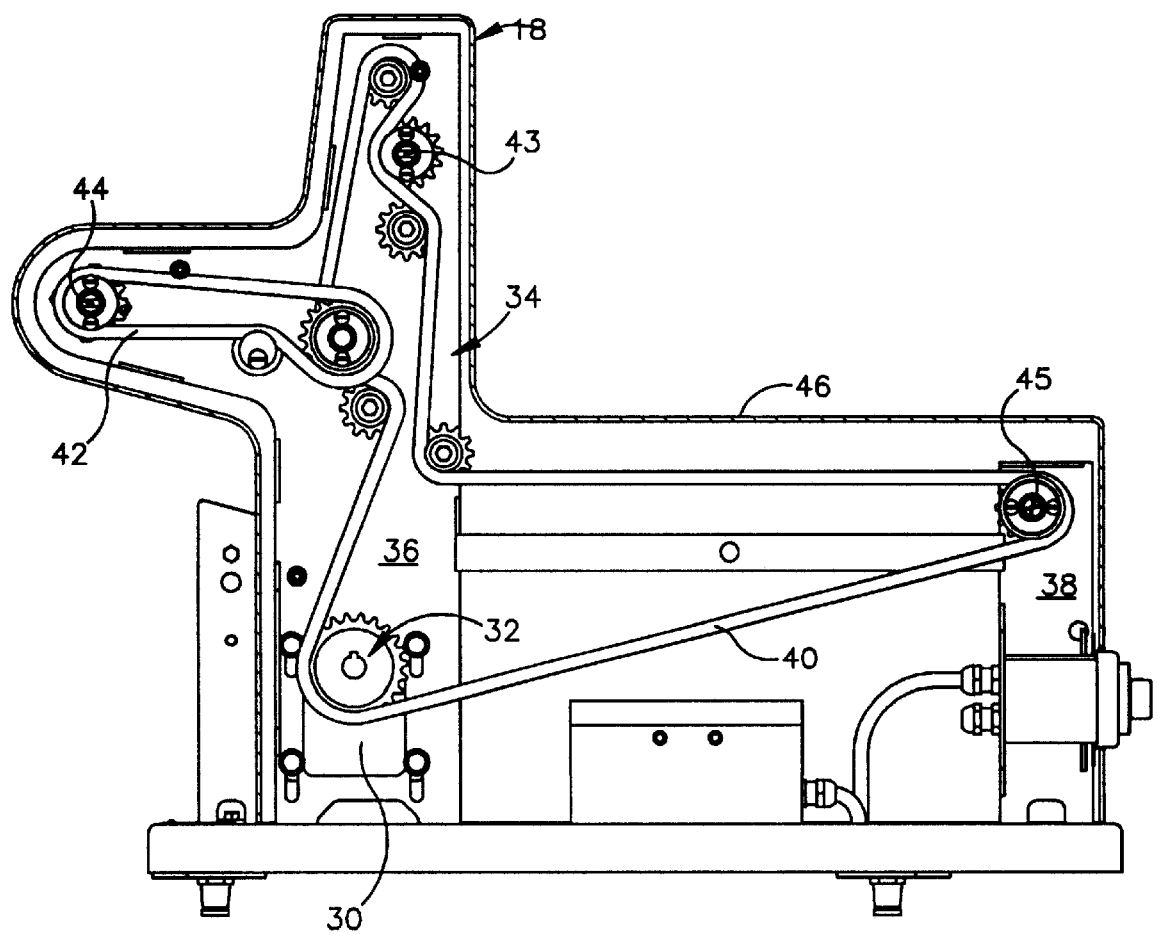
FIG. 6 is a view of part of the machine of FIG. 1 with parts removed.

The drive system 18 (see FIGS. 1–3 and 6) is constructed and arranged to drive food product conveyor systems associated with the battering and breading units so that food products are conveyed substantially continuously through the machine 10. The illustrated drive system 18 comprises a drive motor 30, a drive transmission 32 (FIG. 6) between the motor and the unit conveyor systems, and a tower structure 34 for supporting the transmission 32 and, to some extent, parts of the conveyor systems. The tower structure 34 comprises towers 36, 38 that are anchored to and spaced apart along the base plate 20. The towers 36, 38 are illustrated as relatively thick steel plates. The motor 30 is anchored to the tower 36 and drives the transmission through a gear reduction and an output shaft that is supported by bearings in the tower 36. The drive transmission 32 is illustrated as a chain drive comprising two drive chains 40, 42 and shafts and sprockets that run in mesh with the drive chains and are rotatably supported by the towers 36, 38. The towers 36, 38 rotatably support drive shafts 43, 44, 45 each carrying a driving sprocket at one end and extending through a bearing in the associated tower plate to transmit drive to the breading and battering unit conveyor systems. A chain guard structure 46 (FIG. 1) encloses the tower structure 34 and drive transmission 32. The motor 30 is illustrated as an electric motor.

The illustrated battering unit 14 receives food items placed in it by an attendant, completely immerses the items in a batter pool, enables excess batter to be shed from the items and delivers the battered items to the breading unit. The battering unit 14 that is illustrated in FIGS. 1 and 2 is described and illustrated in U.S. Pat. No. 5,924,356 and the illustrations and description there are incorporated herein in their entireties by this reference to that patent. Consequently, the battering unit is not described here in complete detail.

The battering unit 14 comprises a batter reservoir 50 and a battering unit conveyor system 52. The battering unit conveyor system 52 is supported by the batter reservoir 50 and operated by the drive system 18 to move food products through the batter reservoir and deliver them to the breading unit.

The batter reservoir 50 is illustrated in the form of an open top tank with the battering conveyor system 52 occupying the tank. The conveyor system 52 moves food items placed in the unit 14 at the machine end 10a through a batter pool in the tank and delivers food items from the tank into the breading unit. The batter reservoir is seated atop the breading unit 16. In the illustrated machine the reservoir rests on a pair of support rods 60 that extend between supporting plates 62 that project upwardly from the breading unit 16. The battering reservoir, with its contents, is lifted off the support rods for cleaning and maintenance.

The illustrated conveyor system 52 comprises a food product battering section 80, a product delivery conveyor section 82 projecting from the tank downwardly toward the breading unit, and a conveyor driving assembly 83 coupled to the drive transmission 32. The conveyor sections 80, 82 share a common conveyor "belt" 84. The belt supports the food items over minimal contact areas to maximize: contact between food products and the batter while minimizing the amount of batter remaining on the conveyor belt after passing through the batter pool.

The illustrated belt 84 is fabricated from linked metal wires forming a wide mesh, screen-like chain that extends substantially across the lateral width of the reservoir. The illustrated driving assembly 83 (FIG. 2) comprises a drive shaft 83a that extends laterally across the conveyor at the juncture of the sections 80, 82. The shaft carries belt driving sprocket wheels 83b spaced apart between the sides of the battering conveyor and the input shaft 43 driven by the transmission 32. The shaft 83a is detachably connected to the drive shaft 43 by telescoping the shaft ends together in driving relationship (not illustrated). The shafts can be disconnected manually by a machine attendant when the battering unit is removed for cleaning or replacement. The driving connection can be formed by a female shaft end forming a slot and a conforming tooth on the other male shaft end, by male and female splines, etc. While a wire mesh conveyor belt is illustrated, any suitable form of conveyor could be employed.

The battering conveyor section 80 extends between the reservoir entrance and discharge while the battering conveyor delivery section 82 projects from the battering section 80 for delivering battered food items to the breading unit. The delivery section comprises a manual adjustment mechanism 90 and a delivery conveyor end section 92 projecting from the mechanism 90. The end section 92 cooperates with the adjustment mechanism such that the projecting conveyor end is adjustably positionable vertically relative to the breading unit.

The adjustment mechanism 90 enables the machine attendant to manually reposition the conveyor end section 92 to accommodate food products having differing thicknesses. The illustrated mechanism 90 comprises knobs 94 that are manually loosened to enable the end section 92 to be shifted about the axis of the knobs to a desired adjusted position and then retightened to clamp the end section in its adjusted position. The mechanism 90 is illustrated and described in detail in the aforementioned U.S. Pat. No. 5,924,356.

The breading unit 16 is illustrated by FIGS. 1–5 and comprises a breading material reservoir 100, a breading unit conveyor system 102 for moving food products and breading material along a travel path 104 through the breading material reservoir, a breading application station 106, a breading material flow controlling system 108 that operates so that food products conveyed through the station 106 pass through a standing wave of breading material, and a breading discharge mechanism 110 for directing breading material out of the reservoir when the breading unit is being emptied of breading material.

The reservoir 100 is constructed and arranged so that breading material that is not applied to food items passing through the station 106 is recirculated through the reservoir by the conveyor system. The reservoir 100 is illustrated as an open top hopper-like construction defining parallel side walls 111, a horizontal base section 112, an end wall 114 beneath the battering conveyor end section 102, and an upwardly sloped bottom wall 116 extending between the horizontal base section 112 and the end wall 114. The reservoir end 118 corresponding to the machine end 10a is open so that food products discharged from the machine pass through the open end 118 adjacent the base wall section 112. A breading supporting panel 119 extends across the reservoir between the end wall 114 and the breading station 106. The illustrated reservoir 100 is constructed from sheet stainless steel and is detachably secured to the base frame 12 so that the reservoir is manually removable from the base frame without using tools. The illustrated reservoir is constructed for complete disassembly to facilitate cleaning.

The breading unit conveyor system 102 propels the food items and breading material along the travel path 104 and recirculates the breading material through the reservoir 100. The illustrated conveyor system 102 comprises first and second food product conveyor sections 120, 122 for conveying food products received by the breading unit conveyor system downwardly and horizontally to the breading station and thereafter out of the breading unit at the machine end 10a. The first, food product receiving conveyor section 120 is located adjacent and below the distal end of the battering unit conveyor and is positioned vertically above the level of the breading station 106 and horizontally spaced from the breading station. The second food product conveyor section 122 receives food product from the first conveyor section 120, propels breading material and food products generally horizontally across the breading support panel 119, through the breading station 106, discharges breaded food products from the unit 16, and recirculates unused breading through the reservoir 100. In the illustrated breading unit the breading conveyor sections 120, 122 are formed by independent conveyors so that each section has a conveyor belt that is separate from the belt of the other section.

Figure 7:
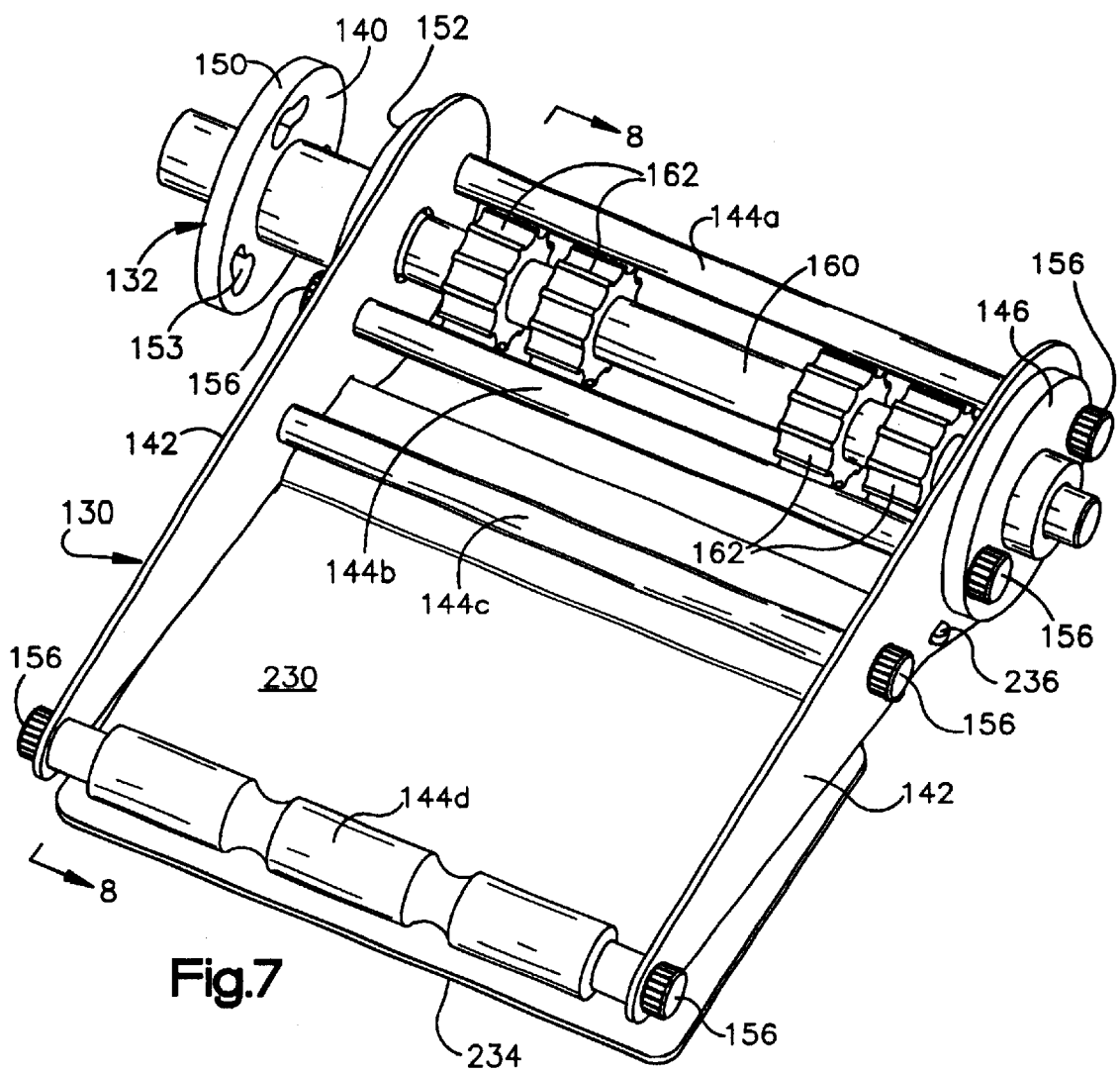
FIG. 7 is a perspective view of part of the machine of FIG. 1.
Figure 8:
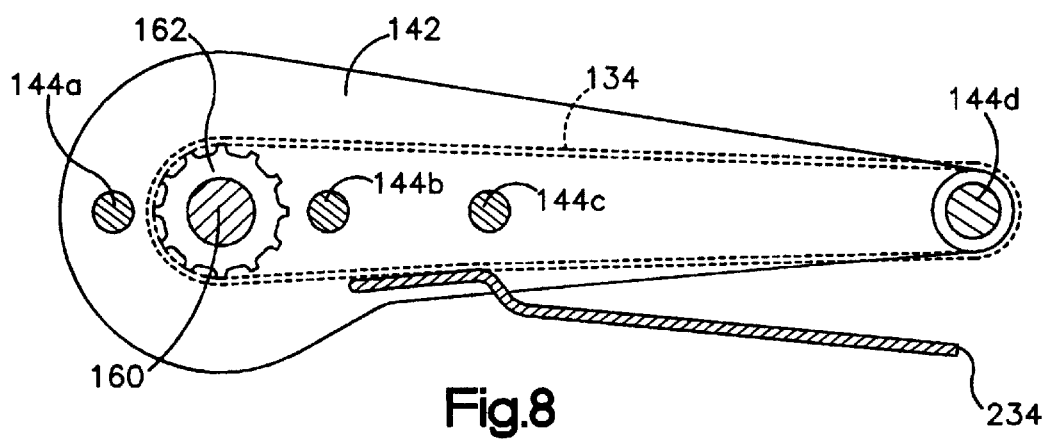
FIG. 8 is a view seen approximately from the plane indicated by the line 8—8 of FIG. 7.

The conveyor section 120 receives food products from the battering unit conveyor system, reverses the products' direction of travel, and delivers them to the conveyor section 122. The conveyor section 120 is angled downwardly so that the food products delivered to it from the battering conveyor are delivered gently onto the conveyor section 122. Referring to FIGS. 7 and 8, the conveyor section 120 comprises a framework 130, a drive shaft assembly 132 detachably connected to the transmission 32, and a conveyor belt 134 driven by the shaft assembly 132. The illustrated belt 134 is constructed like the belt 84 but may be of any suitable construction. The proximity between the conveyor sections 102 and 120 assures that elongated flaccid products bridge the conveyor sections as the transfer takes place and that frangible products transferred to the conveyor section 120 are not broken.

The framework 130 supports the drive shaft assembly 132 and the conveyor belt 134. The framework 130 comprises a supporting hub 140, laterally spaced side frame members 142, transverse tie rods 144*a–d* that extend between and support the side frames, and a drive shaft bearing assembly 146 that supports tie rods 144*a*, 144*b* and the shaft assembly end remote from the hub 140.

The supporting hub 140 is a tubular member into which the shaft assembly 132 extends and which cantilevers the framework 130 to the tower 36. The hub 140 is illustrated as formed by a tubular cylindrical body having outwardly extending flanges 150, 152 at its opposite ends. The flange 150 defines a plurality of circumferentially spaced keyhole slots 153 that receive respective headed studs 154 that are fixed to the tower 36 (See FIGS. 2 and 3). As illustrated, the studs are carried by a flanged tube 155 that is fixed to the tower 36 by suitable fasteners and encircles the drive shaft 44 that projects into the tube 155. The hub flange 152 is fastened to the side frame 142.

The side frames 142 are illustrated as sheet metal members that extend along respective opposite sides of the conveyor belt 134. The tie rods 144 extend between the side frames and are secured in place by thumb screws 156 that clamp each end of each tie rod to a respective side frame member. In the illustrated machine the tie rods have threaded openings in each end, each of which receives a thumb screw that extends through a hole in the adjacent side frame. The head of each thumb screw bears on the side frame to clamp the side frame and tie rod together. The tie rods 144*a* , 144*b* are clamped between the side frames, the hub flange 152 and the bearing assembly 146. The tie rod 144*d* extends between the side frame ends remote from the hub 140 and defines an external surface that is shaped to guide the belt 134 around the end of the conveyor section.

The shaft assembly 132 is driven from the chain drive and supported for rotation between the hub 140 and the bearing assembly 146. The illustrated shaft assembly comprises a shaft member 160 and belt driving sprockets 162 that are attached to the shaft member. The shaft member end that projects through the hub 140 is supported in a bearing mounted in the hub and telescopes into driving relationship with the drive shaft 44 when the conveyor section 120 is assembled to the tower 34.

The illustrated machine 10 is constructed so that the belt 134 not only reverses the direction of travel of products delivered from the battering conveyor section 102, but also increases their travel speed. Thus products moving off the battering conveyor section 82 move onto a belt that has a higher surface speed. This tends to straighten and stretch products that are bridging the conveyors and eliminate folds.

The conveyor section 120 is manually assembled to and removed from the tower 34 by relatively rotating the hub flange 150 and the supporting member 155 so that the studs 154 are released from the keyhole slots in the hub flange. The conveyor section is then pulled laterally away from the tower 34 so that the shaft assembly 132 is removed from the drive shaft 44.

The conveyor section 122 operates to direct food items and breading to the breading station, discharge the breaded food items from the machine 10, and recirculate the unused breading material through the breading unit. As noted, the conveyor section 120 is angled downwardly with its discharge end located adjacent the conveyor section 122. The conveyor section 122 is located immediately adjacent the discharge end of the section 120 and operates to create a flow of breading material out of the bottom of the breading reservoir, past the discharge end of the conveyor 120 and into the breading station. The food products discharged from the conveyor 120 are gently deposited onto the breading material that is passing by on the conveyor section 122 just below. The proximity of the discharge end of the conveyor section 120 to the breading carried on the conveyor section 122 assures that elongated, flaccid products—like chicken tenders and fish filets—ridge the conveyor sections during the transfer and that frangible items are not broken.

The illustrated conveyor section 122 is multi-tiered, providing an upper run 170 that conveys both breading and food products to the breading station, a lower run 172 onto which breaded food products are dropped from the upper run 170 and which then conveys the breaded products to a discharge location at the machine end 10*a*, and a breading recycling run 174 that extends along the base wall section 112 and the sloping wall 116 for conveying unused breading from the reservoir to the upper run 170. The illustrated conveyor section comprises a single belt 180, a belt drive shaft assembly 182 disposed in the reservoir and detachably connected to the transmission 32, belt guides 184, and a belt tensioner 185.

The transmission 32 of the illustrated machine is configured so that the belt surface speed of the conveyor section 122 is greater than the belt speed of the section 120. Accordingly, food products moving from the section 120 are accelerated as they pass onto the section 122. As the products bridge the conveyor sections they tend to be stretched out and straightened during the transfer.

The belt 180 is illustrated as constructed like the belt 84 in that it comprises a wire mesh structure that supports the food products but permits breading to drop from the belt into the reservoir at locations where the belt is not located over the breading supporting panel 119. While a wire mesh belt is illustrated, other forms of conveyor can be utilized so long as they perform the same function as the wire mesh belt, i.e. the conveyor moves the food products along the travel path beyond the breading station while enabling the unused breading to be returned to the breading reservoir without being discharged from the machine with the food products.

The belt drive shaft assembly 182 is located at the discharge end of the upper conveyor run 170 so that the belt 180 is pulled across the panel 119 and through the breading station. The illustrated drive shaft assembly 182 comprises a shaft 186 that extends from the transmission 32 through the reservoir 100, bearings 188 supporting the shaft for rotation in the reservoir side walls, sprockets 190 fixed on the shaft for driving the belt, and a drive coupling 192 for detachably securing the shaft 186 to the drive transmission shaft 45. The drive coupling 192 is formed by telescoping end portions of the shaft 186 and the shaft 45. In the illustrated machine the shaft 45 has a female end opening (not illustrated) that defines a central bore with diametrically opposed axial slots extending from it. The shaft 186 defines a projecting male end (not illustrated) that is conformed to the shape of the female end opening and slides axially into the shaft 45 to provide a driving connection that transmits adequate torque to operate the breading unit conveyor section 122. The driving coupling 192 also serves to maintain the unit 16 in proper alignment with the base frame 12.

The belt guides 184, together with the shaft assembly 182, train the belt 180 to define the conveyor runs 170, 172, 174 and comprise an idler shaft 184a at the end of the run 170 opposite to the shaft assembly 182, a pair of belt guiding elements 184b that direct the belt from the shaft assembly 182 to the lower run 172, and a guide shaft 184c, at the machine discharge end 10a, around which the belt 180 is trained as it leaves the lower run 172 and moves onto the recycling run 174.

The belt 180 moves upwardly along the sloping reservoir bottom wall 116 and around the idler shaft 184a in alignment with the shaft assembly 182 on the upper run 170. The idler shaft 184a thus defines an end of both the recycling run 174 and the upper run 170. The illustrated idler shaft 184a is an undriven rotatable shaft that extends laterally across the reservoir 100 adjacent the end wall 114 and carries sprocket wheels that run in mesh with the belt 180. The shaft 184a is supported in bearings that are mounted in the reservoir sidewalls.

The belt guiding elements 184b guide the belt 180 off of the drive shaft assembly 182 and train the belt along a smooth re-entrantly curved path—i.e. curved oppositely from the belt curvature as it passes around the shaft assembly 182—from the shaft assembly 182 to the lower run 172. The reverse curvature of the belt proceeding from the shaft assembly 182 assures that food products passing the shaft assembly 182 on the upper run 170 fall onto the lower belt run 172. Each of the illustrated elements 184b is formed by a curved plastic plate that is attached to a respective reservoir side wall 111 below the shaft assembly 182. The elements 184b thus engage the opposite side edge portions of the belt.

The guide shaft 184c is a rod-like member that extends between the side walls 111 at the open reservoir end 118. The illustrated shaft 184c is constructed from stainless steel and has an outer surface defined by a series of cylindrical lands 190 that are quite smooth to allow the belt 180 to pass around the shaft 184c with minimal friction. The shaft 184c has an axially extending mounting pin 192 at each end by which the shaft is supported in the reservoir 100. As illustrated, the base wall section 112 at the open reservoir end 118 terminates short of the ends of the side walls 111 so that food products passing the shaft 184c drop out of the machine end 10a beyond the base wall section.

The belt tensioner 185 maintains the belt tension relatively constant during operation of the machine 10. The illustrated tensioner 185 (See FIGS. 1 and 4) comprises a belt engaging tensioning member 200 that is resiliently biased into engagement with the belt on the recycling run 174, tensioning member support arms 202 mounting the member 200 to the reservoir 100, and links 204 that extend between the tensioning member 200 and the shaft 184c for shifting the shaft position relative to the reservoir as the belt tensioning member 200 changes position.

The illustrated tensioning member 200 is a relatively heavy shaft-like rod having a smooth periphery that slidingly engages the belt with little friction. The tensioning member 200 is gravity biased against the belt. The member 200 normally bears on the belt 180 and urges the belt toward the sloping bottom wall 116 so that the recycling run 174 is normally a bit dog-legged with one section running along the reservoir base section 112 and the other section running along the sloping bottom wall.

Each tensioning member supporting arm 202 is pivoted to a respective reservoir side wall 111 at one end 202a and fixed to an end of the tensioning member 200 at the opposite end. The arms 202 extend adjacent their respective sidewalls and pivot about a common axis that is parallel to the tensioning member.

The links 204 coordinate movement of the tensioning member 200 with the shaft 184c to assure that the belt 180 is not momentarily subjected to excessive tension. Each link is pivotally attached to a respective end of the tensioning member 200 and to an end of the shaft 184c. When the belt 180 is subjected to a momentary increase in the load applied along the upper run 170 the recycling belt run 174 tends to straighten out, lifting the tensioning member 200 away from the sloping reservoir wall 116. As the member 200 is moved away from the wall 116, the links 204 shift toward the sloping wall 116 thus shifting the shaft 184c laterally.

As illustrated, the shaft pins 192 extend through the links 204 and through slots 210 in the side walls 111. The slots 210 are illustrated as rectangular and permit limited motion of the shaft 184c relative to the side walls to accommodate the changes in belt tension that might otherwise unduly stress the belt if the shaft 184c were fixed in place. The illustrated slots 210 are sized to permit limited horizontal and vertical motion of the shaft 184c.

In the illustrated machine 10 belt guiding skids 205 extend between the links 204 for supporting the lower run 172 as it moves toward the shaft 184c and to assure separation of the lower run from the recycling run 174. The skids 205 are illustrated as smooth belt engaging wires that extend in the direction of belt travel and laterally extending wires that are fixed to the links 204 and support the skid wires.

Whether the recycling run 174 is dog-legged or relatively straight (as a result of increased tension in the conveyor system), the belt 180 sweeps unused breading material adjacent the base wall section 112 and the sloping bottom wall 116 upwardly toward the end wall 114 where the breading material wells up and is conveyed by the belt in the upper run 170 across the panel 119 toward the breading station 106. In the illustrated machine 10, the flow of the breading up and out of the reservoir is directed so that spillage does not occur and the material is distributed across the panel 119 in a pattern that facilitates complete coverage of the food items at the breading station. As illustrated, the uppermost side of the end wall 114 is provided with a flange 220 that extends the width of the end wall and projects into the reservoir 100 so that breading material that wells up from the bottom of the reservoir does not spill out of the reservoir over the end wall.

The breading flow control system 108 both controls and restricts the passage of breading material through the breading station 106 without impeding the movement of food products. Food products passing through the breading station are inundated by breading material accumulated there. The breading flow control system 108 comprises a breading diverter 230 for forming the breading material as the conveyor moves the material toward the loading location and a breading flow restrictor 232 for creating a standing wave of breading material at the station 102.

The illustrated diverter 230 is formed by a breading plow that projects from the conveyor section 120 toward the upper conveyor run 170 to produce a smooth flat bed of the breading material passing under the end of the conveyor section and continuous parallel breading mounds forming opposite lateral sides of the breading material bed. The illustrated plow (FIGS. 1, 7 and 8) comprises a plate-like rectangular member having a projecting side 234 that extends into the breading material being moved by the conveyor, so that some of the breading flow is diverted around the opposite plow plate sides to form the mounds. The plow is attached to the conveyor section by tabs 236 that project from opposite sides of the plate-like plow member through slots in the conveyor section side frames 142.

The breading flow restrictor 232 creates the standing wave of breading material at the breading station through which the food products are conveyed. The flow restrictor 232 comprises wall sections 240, 242 (FIGS. 4 and 5) that extend over the upper conveyor run and the panel 119 to direct the breading material in a convergent flow pattern toward the breading station, and a plurality of breading flow restrictor members 244 respectively supported above the upper conveyor run 170 at the breading station for maintaining a fluidic mass of breading material at the breading station.

The illustrated side wall sections 240, 242 each have a convergent portion that interacts with the breading material flowing along the upper run. The convergent sections interact with the breading material so that the mounds of breading are channeled inwardly toward the center of the upper run and break like waves over food products approaching the breading station. The side walls have parallel extending portions that extend from the inner ends of the convergent portions through the breading station 106. The side walls 240, 242 are fixed in position with respect to the breading station with the parallel wall portions forming a throat section through which most of the breading and the food products are directed.

The illustrated machine employs two rows of restrictor members 244 that are supported between the side walls 240, 242 at the throat section. Each restrictor member 244 defines a surface 246 biased toward the upper conveyor run 170. The surfaces 246 of each row of restrictors are disposed adjacent each other proceeding laterally across the station 106. The surfaces 246 are aligned normal to the travel path. When the surfaces 246 of each row are horizontally aligned and adjacent the belt, they collectively provide a virtually continuous obstruction to breading material that would otherwise pass unobstructed through the station 106 above the level of the belt. The surfaces 246 are biased toward the conveyor by the weight of each member 244.

The surfaces 246 mound the breading material just upstream from the station 106 to create the standing wave of the material. When sufficient breading material has mounded upstream from a restrictor member 244, the breading material pressure exerted on the member 244 raises the member from the conveyor and breading material passes under the member from the breading station. The amount of breading material passing under any member 202 depends on the conveyor speed, the breading material consistency, and the member weight and position. The conveyor speed is relatively constant so an equilibrium state typically is reached where a relatively constant amount of breading material flows under a given restrictor member.

When a food item moves into the station, those restrictor member surfaces that engage the item shift upwardly and move in conformity with the food item profile as it passes the raised restrictor member. The restrictors thus operate to tamp the passing food item without interfering with food item movement. At the same time the restrictor members that pass over a food item at the breading station obstruct nearly all but a surface coating of breading material from passing through the station 106 on the food item. Restrictor members that do not engage the food item remain in their initial, equilibrium positions adjacent the belt.

In addition to their individual tamping and breading flow restricting functions, the restrictor members collectively act to compress the breading material against the food products at the application station. Because of the fluidic nature of the breading material moving along the conveyor, the restrictor members pressurize the breading material as it is moved into the throat section and, in effect, pack the breading against the food item even at locations along the lateral sides of the products where a restrictor member is not tamping the item.

In the illustrated machine 10 the restrictor members of each row of restrictors are pivoted about a respective common axis extending between the side walls 240, 242. In the illustrated machine, pivot shafts 250, 252 are detachably carried in respective sidewall notches and each pivot shaft extends through a conforming hole in each restrictor member of the row. As the restrictor members engage the food products, the surfaces 246 ride over the products as the restrictor members pivot about the axis of the pivot shafts at their remote ends. An additional notch is provided so that the angularity between the restrictor members and the conveyor can be adjusted by repositioning the pivot shafts between alternative notches. This changes the restrictor member biasing forces and alters the breading material pressure at the breading station.

The panel 119 extends under the upper conveyor run 170 at the breading station 106 and terminates just short of the locations where the restrictor surfaces are located. When the food products emerge from the breading station, most of the breading material that moves along with the food products is no longer supported by the panel 119 and drops through the conveyor belt to the bottom of the reservoir 100. Some breading emerging from the breading station may cling to the conveyor belt wires. Further, when the breading material is dampened from batter, clumps of the material tend to bridge the wire mesh forming the belt and may not automatically fall into the reservoir. In the illustrated breading unit, spring leaves 254 are resiliently biased against the belt and repeatedly strike the belt as it moves. The repetitive spring leaf impacts on the belt vibrate the belt and dislodge breading material from the it. The spring leaves are supported and tensioned by dowel pins (not illustrated) that project from the side walls. The spring leaves are removable from the unit by sliding them off of the dowel pins.

Breaded food products sometimes tend to carry loose, excess breading on them after they have emerged from the breading station. The machine 10 is so constructed and arranged that the excess breading is removed from the products and recycled. After the breaded food products emerge from the breading station 106 they pass the drive shaft assembly 182 and drop from the upper run 170 to the lower run 172. Any remaining loose breading on the food products is shed as a result of the impact with the lower run belt. The loose breading falls through the belt and into the reservoir base section 112. The recycling run belt 174 sweeps the accumulated breading from the base section 112 upwardly along the sloping section 116 from which it is conveyed through the breading station again.

The food products remaining on the lower run 172 are discharged from the machine over the open end of the reservoir base section 112 as the food products pass the guide shaft 184c. The illustrated machine 10 is constructed so that a frying basket may be positioned below the machine discharge end 10a for accumulating food products for frying. The basket and its contents can be placed directly into the fryer when a sufficient number of products has been accumulated. The small foot print and the machine architecture that permits loading and discharging food from the machine end 10a makes it possible and desirable to station the machine 10 adjacent the fryers. This feature provides for enhanced convenience and efficiency.

When frangible food products are breaded, they are discharged from the upper conveyor run 170 directly into a fryer basket or other suitable container (not illustrated), or into the hands of a machine attendant. Food products, such as croquettes or other products that could break up on impact with the lower run 172, are accessible at the end of the upper conveyor run through the open end of the reservoir. A receiving container may be supported between the reservoir sidewalls 111 just beyond and below the shaft assembly 182 and above the lower run 172. The frangible products are deposited gently into the container without damage.

According to the present invention emptying the reservoir of breading material is accomplished quickly and easily by use of the breading discharge mechanism 110 without requiring lifting and manually dumping the reservoir and without the need for partially disassembling the breading machine conveyor drive system. The breading discharge mechanism 110 that is constructed and arranged so that the breading material can be discharged from the machine into a receptacle without requiring the machine to be moved from its normal position. The illustrated mechanism comprises a member 302 that is movable to create a breading discharge opening 304 in the reservoir 100 that is spaced above the lower end of the sloping wall 116 so that the conveyor system 102 is operable to deliver breading material through the discharge opening to empty the reservoir.

In the illustrated machine 10 the reservoir the member 302 forms part of the reservoir end wall 114 so the breading material is discharged through the end wall 114. As illustrated in FIGS. 1, 3 and 4, the end wall 114 is formed by a fixed panel 306 that is integral with the side walls 111 and having its lower edge fixed to the end of the sloping bottom wall 116. The panel 306 defines a slot 310 extending nearly the width of the reservoir 100 adjacent the lower edge of the panel. The member 302 is illustrated is a panel that is connected to the panel 306 on the reservoir exterior and defines a lateral slot 312 that is the same size and shape as the slot 310. The member 302 is normally clamped in place to the panel 306 with the slots 310, 312 out of registration with each other so that breading material does not escape from the reservoir through the end wall.

As illustrated by FIG. 3, the member 302 is formed with parallel slots 314, 316 that extend vertically on opposite lateral sides of the slot 312. A threaded stud, welded to the panel 306, extends through each slot 314, 316. Hand knobs 320 are screwed onto the studs and engage the member 302 to clamp it in place. The lower end of each slot 314, 316 is illustrated as having a lateral extension (See FIG. 3a). When the member 302 is in its uppermost position, with the slots 310, 312 out of alignment, the member can be shifted laterally relative to the panel 306 and supported by the studs as the hand knobs 320 are tightened to clamp the member in place.

When breading is to be discharged from the reservoir, a receptacle is placed under the end wall 114, the knobs 320 are loosened, and the member 302 is moved laterally to align the threaded studs with the vertical sections of their respective slots 314, 316. The member 302 then slides downwardly under the influence of gravity until the studs engage the upper ends of the slots 314, 316 (FIG. 3a). At that juncture the slots 310, 312 are aligned so that when the conveyor system 102 is operated, the breading is discharged through the aligned slots 310, 312. A flange 322 on the upper edge of the member 30, facilitates shifting the member between its various positions.

While a slidable member 302 has been illustrated as mounted at the end wall 114, other structures employing members movable to create a breading discharge opening in the reservoir that is spaced above the lower end of the sloping wall, so long as the material is discharged along the sloping wall at a location that is elevated above the bottom of the reservoir sufficiently to enable a breading receptacle to be positioned below.

While a single embodiment of the invention has been illustrated and described in considerable detail, the invention is not to be considered limited to the precise construction disclosed. Various adaptations, modifications, and uses of the invention may occur to those skilled in the business to which the invention relates. The intention is to cover all such adaptations, modifications, and uses coming within the spirit or scope of the appended claims.

What is claimed is:

1. A machine for coating food products with a particulate breading material comprising:
    a. a battering unit for applying a fluent batter to a food product comprising a batter reservoir and a battering unit conveyor system for delivering food products from said batter reservoir;
    b. a breading unit for applying particulate breading to the food product comprising a breading material reservoir, a breading station at which breading is applied to the product and a breading unit conveyor system for delivering food products from said battering unit and breading material from the breading material reservoir to said breading station;
    c. said battering unit supported above said breading unit with said battering unit conveyor system having a discharge section that propels the food product in a first generally horizontal direction from said battering unit reservoir, food products being delivered from a distal end of said discharge section to said breading unit conveyor system;
    d. said breading unit conveyor system propelling food product toward said breading station in a second direction that is generally opposite to said first direction, said breading unit conveyor system having a product receiving conveyor section located adjacent and below the distal end of said battering unit conveyor, said food product receiving conveyor section located vertically above the level of said breading station and horizontally spaced therefrom for receiving food products from said distal end so that food products received by said breading unit conveyor system are conveyed downwardly and horizontally to said breading station.

2. The breading machine claimed in claim 1 wherein said breading unit conveyor system further comprises a second product receiving conveyor section that extends generally horizontally from below the first product receiving conveyor section to said breading station, said first product receiving conveyor section delivering food products to said second product receiving conveyor section.

3. The breading machine claimed in claim 2 wherein said breading unit conveyor system comprises first and second conveyors, said first product receiving conveyor section formed by said first conveyor and said second product receiving conveyor section formed by said second conveyor.

4. A machine for coating food products with particulate breading material comprising:
    a. a battering unit for applying a fluent batter to a food product comprising a batter reservoir and a battering unit conveyor system for delivering food products from said batter reservoir;
    b. a breading unit for applying particulate breading to the food product comprising a breading station at which breading is applied to the product and a breading unit conveyor system for delivering food products from said battering unit to said breading station;
    c. said battering unit supported above said breading unit and comprising a battering unit conveyor system that propels the food product in a first generally horizontal direction through the battering unit, said battering unit conveyor system having a distal end that delivers food products to said breading unit conveyor system;
    d. said breading unit conveyor system propelling food product toward said breading station in a second direction that is generally opposite to said first direction, said breading unit conveyor system comprising first and second food product conveyors, said first conveyor located adjacent and below said distal end, said second food product conveyor located below said first conveyor for delivering food products from said first conveyor to said breading station.

5. The machine claimed in claim 4 wherein said breading unit comprises a breading reservoir at least part of which is disposed below said breading station and said first and second breading unit conveyors, said second conveyor recycling unused breading through said reservoir.

6. The machine claimed in claim 4 further comprising a conveyor drive transmission for driving said conveyor systems, said transmission driving said battering unit conveyor system at a lower speed than said first conveyor and said transmission driving said second conveyor at a greater speed than said first conveyor.

7. The machine claimed in claim 4 further comprising a conveyor drive transmission supported by a tower structure extending beside said breading and battering units, said first conveyor cantilevered to said tower structure.

8. The machine claimed in claim 5 wherein said second conveyor comprises an upper run, a lower run and a recycling run, said upper run delivering breaded food products and unused breading from said breading station with unused breading falling into the reservoir and food products falling onto said lower run, breading material not adhered to food products falling onto said lower run falling into said reservoir, and said lower run discharging breaded food products from said machine.

9. A breading machine comprising a breading unit and a battering unit that is supported atop the breading unit:

said battering unit comprising a batter reservoir and a battering unit conveyor system for moving food products generally horizontally through the batter reservoir, said battering unit conveyor system having a conveyor section projecting downwardly from battering unit toward the breading unit;

said breading unit having a breading reservoir, a breading conveyor system and a breading station through which food products are conveyed by said breading conveyor system, said breading station located at a level that is below an end of the projecting battering unit conveyor, said breading unit conveyor system having a conveyor section projecting upwardly above the level of said breading station toward said battering unit conveyor end, said projecting battering conveyor unit end closely adjacent said breading unit conveyor section so that food products transferring from the battering unit conveyor to the breading unit conveyor section are supported by both conveyors during the transfer.

10. The machine claimed in claim 9 wherein said breading unit conveyor system further comprises a second conveyor section that conveys food products from said first section to and through said breading station, said first and second conveyor sections respectively formed by separately driven individual belt conveyors.

11. A food product breading machine comprising:

a breading reservoir having a lower wall that slopes upwardly from a lower end, an end wall adjacent an upper end of said sloping wall, and an upper side;

a breading conveyor comprising a conveyor belt disposed in said reservoir with a first conveyor run extending generally horizontally along said upper reservoir side, and a second conveyor run extending along said sloping lower wall, said conveyor moving breading material in said reservoir along said sloping lower wall toward said end wall; and, a breading discharge mechanism comprising a member that is movable to create a breading discharge opening in said reservoir that is spaced above the lower end of said sloping wall with said conveyor operable to deliver breading material through said discharge opening.

12. The food product breading machine claimed in claim 11 wherein said member is mounted for translational motion between a first position where discharging breading material from said reservoir is blocked and a second position where the discharge opening is opened.

13. The food product breading machine claimed in claim 12 wherein said member is mounted on said end wall and breading material is discharged from said end wall.

14. The food product breading machine claimed in claim 11 wherein said discharge opening is formed in said end wall.

15. A food product breading unit for applying particulate breading material to food products comprising:

a breading reservoir having ;a base section containing unused breading;

a food product breading station at which food products are coated with breading material, said breading station located above the level of said reservoir base section;

a conveyor system for conveying food products and breading to said breading station and discharging breaded food products from said unit, said conveyor system comprising an upper conveyor run for conveying food products and breading through said breading station, a lower conveyor run for discharging breaded food products from said unit, and a recycling run for conveying unused breading from said reservoir base section to said upper run;

said lower run located below the level of said upper run and above the level of said reservoir base section, breaded food products from said upper run dropping onto said lower run and being discharged from the unit by said lower run.

16. The breading unit claimed in claim 15 wherein said upper, lower and recycling runs are defined by a single conveyor belt.

17. The breading unit claimed in claim 15 wherein said reservoir comprises a generally horizontal base wall section, a sloping wall section extending from said horizontal base section toward an end wall remote from said horizontal base section, and side walls, said conveyor system further comprising a recycling conveyor run extending along said reservoir base wall section and said sloping wall section for conveying unused breading from said reservoir to said upper conveyor run.

18. The breading unit claimed in claim 15 wherein said upper and lower conveyor runs are disposed above said reservoir and unused breading material that emerges from said breading station drops into said reservoir from said upper and lower conveyor runs.

\* \* \* \* \*